United States Patent [19]

Irwin et al.

[11] Patent Number: 4,896,944

[45] Date of Patent: Jan. 30, 1990

[54] METHOD AND APPARATUS FOR TREPANNING WORKPIECES

[76] Inventors: Timothy L. Irwin, 635 Hidden Valley Dr., Apt. 113, Ann Arbor, Mich. 148104; William L. Clayton, Jr., 317 Grand River Ave., Fowlerville, Mich. 48834

[21] Appl. No.: 223,360

[22] Filed: Jul. 25, 1988

[51] Int. Cl.⁴ .............................................. G02B 7/02
[52] U.S. Cl. .................... 350/247; 219/121.7; 219/121.75
[58] Field of Search .................. 128/305.1; 219/121.7, 219/121.74, 121.75, 121.78; 350/247, 243, 237; 250/202; 318/568, 577

[56] References Cited

U.S. PATENT DOCUMENTS

| | | | |
|---|---|---|---|
| 3,392,259 | 7/1968 | Meier | 219/121.78 |
| 3,576,965 | 5/1971 | Gugger | 219/121.7 |
| 3,848,970 | 11/1974 | Goodell | 219/121.75 |
| 3,860,862 | 1/1975 | Dell et al. | 250/202 |
| 3,986,767 | 10/1976 | Rexer et al. | 350/624 |
| 4,088,864 | 5/1978 | Theeuwes et al. | 219/121.7 |
| 4,430,548 | 2/1984 | Macken | 219/121.75 |
| 4,778,155 | 10/1988 | Suchevich et al. | 219/121.7 |

Primary Examiner—Bruce Y. Arnold
Assistant Examiner—Martin Lerner
Attorney, Agent, or Firm—John C. Evans

[57] ABSTRACT

A method and apparatus for trepanning a workpiece by controlling laser energy on variable diameters thereof includes the method steps of directing a collimated beam of energy against the workpiece and shifting and rotating the collimated beam so as to orbit a focal point on the workpiece to change the trepanning diameter. Apparatus for practicing such method includes a lens housing with a lens holder which is easily removable and is also positionable with respect to a reference axis by a pneumatic pressure acting against a spring loaded stop and further including means for rotating the lens housing on the reference axis to orbit the focal point of a collimated beam of laser energy about the reference axis to vary the trepanning diameter.

10 Claims, 2 Drawing Sheets

METHOD AND APPARATUS FOR TREPANNING WORKPIECES

TECHNICAL FIELD

This invention relates to methods and apparatus for trepanning parts and more particularly to processes which use collimated energy beams for processing parts by focusing the energy beams against the outer surface thereof and positioning the energy beam with respect thereto to form a feature therein.

BACKGROUND ART

U.S. Pat. No. 3,860,862 discloses a method for following an optical line for positioning a metal cutting tool with respect to the surface of a workpiece for forming a feature in the workpiece. The process is carried out by use of X,Y,Z drive systems under the control of logic circuits, binary counters and other control components which follow an optical tracer to control the drive systems to replicate a traced pattern in the workpiece.

U.S. Pat. No. 3,986,767 discloses an optical focusing apparatus wherein a beam of collimated energy is focused on the surface of a workpiece to form a feature therein. While the apparatus varies the position of a focal point on the workpiece it requires movement of the whole laser nozzle head along multiple axes by use of servo motors and drive screw systems.

U.S. Pat. Nos. 3,392,259; 4,389,561; 4,406,940; 4,540,869 and 4,733,048 all disclose laser head apparatus with lens components for focusing laser energy on a work surface.

None of the aforesaid references disclose a method for trepanning parts by a process which varies the trepanning diameter without shifting a laser head by use of the normal multiaxis drive systems of such machining apparatus.

STATEMENT OF THE INVENTION AND ADVANTAGES

An object of the present invention is to perform trepanning operations on a workpiece without operating the primary multiaxis drive systems of processing apparatus and to do so by use of apparatus with an easy to remove and adjust lens.

A further object of the present invention is to perform trepanning operations on a workpiece without requiring adjustment of the cutting head of a trepanning unit along multiaxis drive paths.

Yet another object of the present invention is to provide a method for trepanning a workpiece by directing a collimated beam from an energy source against a focusing lens; offsetting the focusing lens laterally with respect to the collimated beam; and thereafter rotating the shifted lens to direct the focal point of the lens in an orbital path whose diameter is varied in accordance with the lateral offset of the focusing lens.

A feature of the present invention is to provide such a method wherein the lens is positioned by stopping the shifting of the focusing lens by use of a spring abutment and which the amount of the offset is set by a counterpressure on the focusing lens.

Another feature of the present invention is to provide such a trepanning method wherein a laser source is used to define a collimated beam of energy.

Yet another feature of the present invention is to provide a method for cutting sections of variable diameter from the surface of a workpiece by a process comprising the steps of: locating the workpiece in a first reference position; aligning a collimated laser beam with the workpiece and first focusing the beam onto the surface of the referenced workpiece and thereafter shifting the focused beam by laterally offsetting the focal point of the beam on the surface and thereafter rotating the shifted focal point on the surface so as to orbit the focal point with respect to a reference axis.

Yet another object of the present invention is to provide an improved apparatus for trepanning a workpiece including nozzle assembly for focusing a beam of collimated radiation from an energy source; the nozzle assembly housing having an inlet and an outlet and a focusing lens and further comprising a lens holder for supporting the focusing lens in a first aligned position wherein the optical axis of said lens is congruent with a longitudinal axis through the inlet and outlet of the nozzle housing; the assembly further including means for supporting the lens holder for movement laterally within the housing in a plane generally perpendicular to the path of the beam direct between the inlet and outlet; and means for supporting the housing for rotation about its vertical longitudinal axis to rotate the lens and lens holder; and wherein the lens is offset by positioning means for adjusting the supported lens with respect to the longitudinal axis for producing a variable orbital path of the focused beam on a workpiece.

A further feature of the present invention is to provide apparatus of the type in the preceding object wherein the positioning means includes slide means for adjusting the focus spot of the beam outwardly of the longitudinal axis.

A still further feature of the present invention is to provide such apparatus wherein the lens holder means includes spring means for resiliently limiting the travel thereof in one offset direction from the longitudinal axis and for returning the lens holder means in a direction opposite to the one offset direction.

Yet another feature of the invention is to provide such apparatus wherein the positioning means includes a source of gas pressure and means for applying a pneumatic pressure on the lens holder means for shifting it in directions to offset the focal point of the lens with respect to the longitudinal axis.

In a specific embodiment, the nozzle or laser head housing includes a nozzle apparatus with a lens holder therein which is supported through a side slot closed by a spring biasing abutment or stop. The housing is supported for rotation and is driven at its top to rotate about the longitudinal axis of the housing. A port on the housing is adapted to be connected to a source of pressure to provide a pneumatic bias on the lens holder to locate the lens in an offset position to vary the trepanning diameter.

Other advantages, features and objects of the invention will be apparent to those skilled in the art from the succeeding detailed description of the invention and the accompanying drawings thereof.

BRIEF DESCRIPTION OF THE INVENTION

DETAILED DESCRIPTION OF THE PREFERRED EMBODIMENTS

Figure 1:
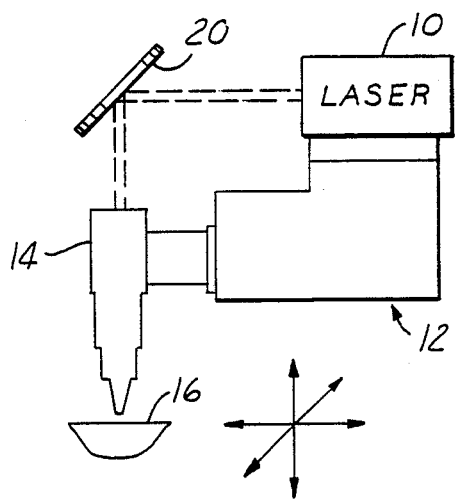
FIG. 1 is a diagrammatic view of a multiaxis laser machine for practicing the method of the present invention and including the features of the apparatus of the present invention.
Figure 3:
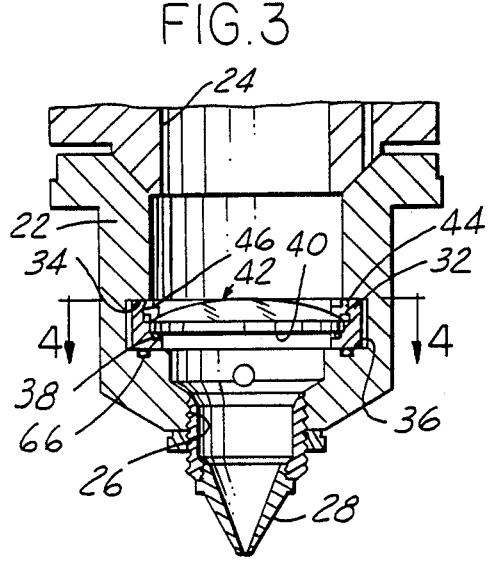
FIG. 3 is a sectional view taken along the line 3—3 of FIG. 2 looking in the direction of the arrows.

FIG. 1 shows a source of laser energy 10 that is supported with respect to a multiaxis drive machine 12 of the type including a base with cross-slides driven by servo-controlled electric drive motors for positioning a laser nozzle assembly 14 with respect to a workpiece 16.

The drive system is operative to move the nozzle apparatus 14 along multiple axes to carry out a variety of lasing operations to form features on the workpiece 16. A collimated beam 18 from the laser source 10 is reflected by a mirror 20 to be directed to the inlet of the nozzle apparatus 14. The nozzle apparatus 14 defines a path for directing the beam and focusing it to define a spot size on the workpiece for carrying out known lasing operations such as heat treating, cutting, welding or the like.

In accordance with the present invention the nozzle apparatus 14 includes a nozzle housing 22 having an inlet 24 and an outlet 26 in the form of a tapered fitting 28 defining a path for the beam 18.

The nozzle housing 22 has a side slot 30 for receiving a lens housing 32 that is slideably mounted on spaced surfaces 34, 36 inboard of the housing 22. The housing 32 supports an 0-ring 38 which seals the surface 40 of a focusing lens 42. The focusing lens 42 is held in place on the lens housing 32 by a retainer ring 44 threadably engaged in a threaded bore 46 in the lens housing 32. The slot 30 enables the focusing lens to be easily removed from the housing 22.

The lens housing 32 is retained within the nozzle housing 22 by a generally arcuately shaped side retainer 48. The retainer 48 has an inboard abutment surface 50 that serves as a stop against lateral movement of the lens housing 32 outwardly of the housing 22. The retainer 48 is held in place within the housing 22 by a latch 50 which is pivotally connected at one end 52 thereof by a pivot pin 54 to the nozzle housing 22. A thumb screW 56 secures the latch 50 in place when positioned to secure the side retainer 48 within the nozzle housing 22.

A pair of spaced hair pin springs 58, 60 each have one end 62 thereof secured to the outer periphery of the lens housing 32. An opposite end of the spring 58 is fixed to the inner surface 60 of the retainer 48 by a screw 64. The opposite end of the spring 60 is slideably engaged with the inner surface 50 without being fastened thereto.

A seal ring 66 is carried in the surface 36 for sealing one face of the lens housing 32 to prevent escape of gas into the laser system.

A fitting 68 is provided on the housing 22 adapted to be connected to a variable pressure source 69 for varying the pressure on a piston 71 abutting the lens housing 32. The piston 71 thereby serves to shift the lens housing 32 laterally within the housing 22 for purposes to be discussed.

Additionally the nozzle housing 22 has an upper segment 22a which is supported by a bearing assembly 70 for rotation about a longitudinal axis 72. More specifically the nozzle housing 22 is rotated about such axis 72 by use of belt 74 driven by an output pulley 76 on the output shaft 78 of a drive motor 80.

The belt 74 wraps on a toothed pulley 82 secured to a shoulder 84 of the housing segment 22a by suitable fastening means such as screws not shown.

By virtue of the aforesaid apparatus, the laser beam 18 can be positioned without moving the multiaxis drive so as to vary the diameter of the trepan.

More specifically, the lens housing 32 can be shifted laterally to cause the focal point of the collimated beam 18 to be located offset from the longitudinal axis 72 about which the nozzle housing 22 is rotated. Consequently, the beam spot will be positioned, depending upon the amount of offset, to vary the trepanning diameter.

Figure 5:
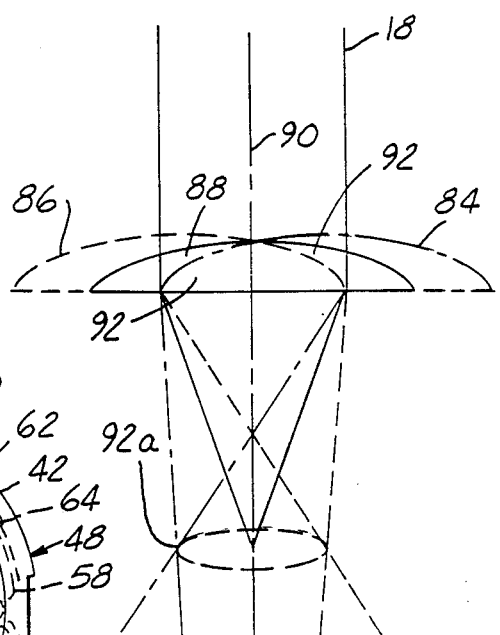
FIG. 5 is a schematic view of offset positions and resulting orbit of the focal point of a laser beam for practicing the method of the present invention.
Figure 4:
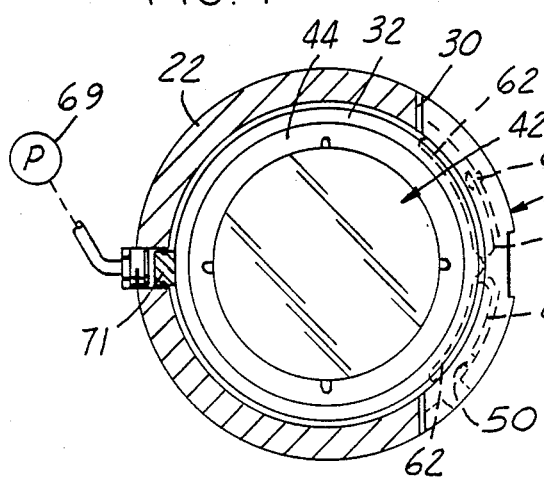
FIG. 4 is a sectional view taken along the line 4—4 of FIG. 3 looking in the direction of the arrows.
Figure 2:
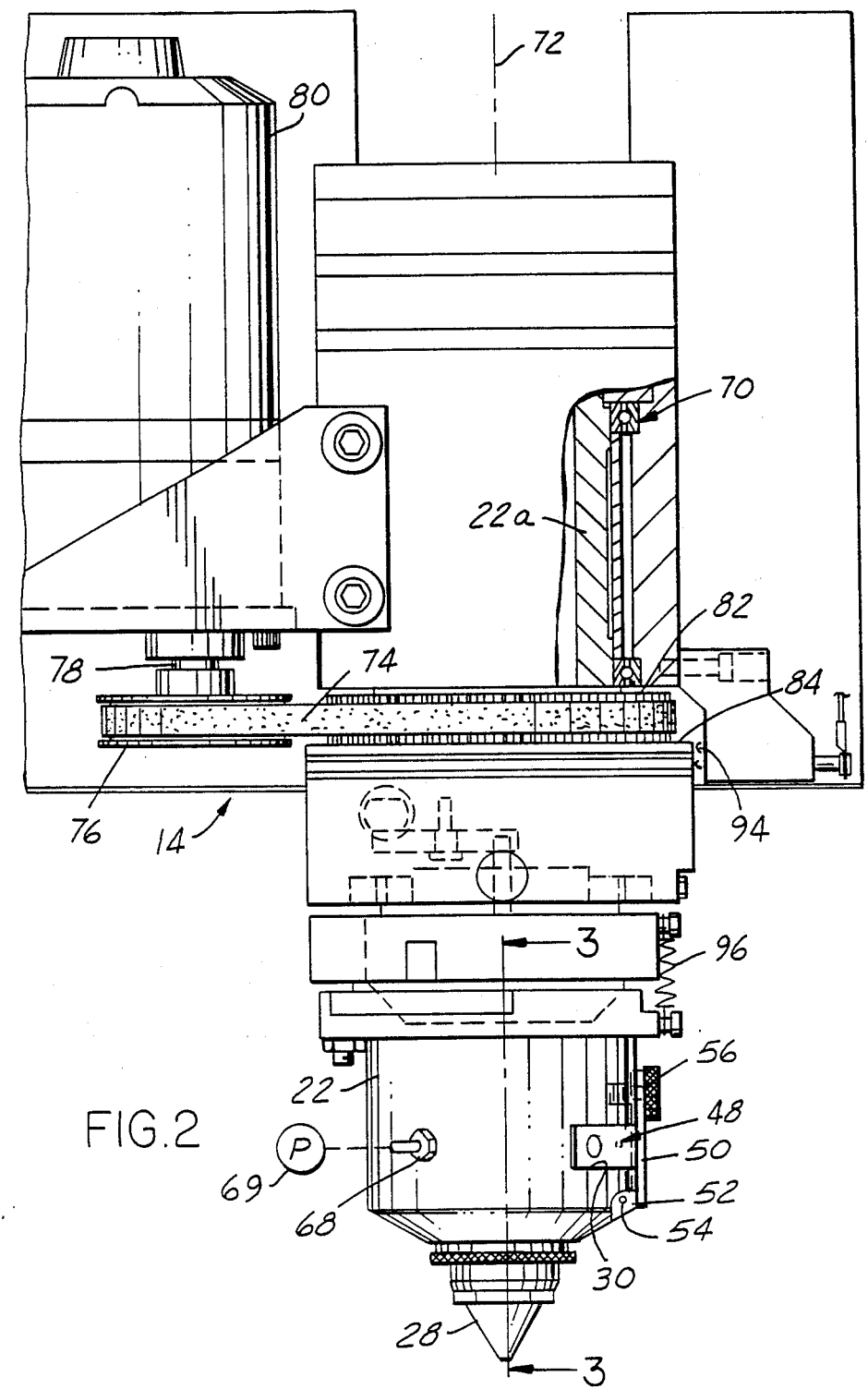
FIG. 2 is an elevational view of the apparatus of the present invention partially sectioned.

The operation and method of the present invention is shown in FIG. 5 as including two offset lens positions 84, 86 on either side of a centered lens position 88 in which the optical axis 90 of the lens is congruent with the longitudinal axis 72 of rotation.

When the lens is in the right lateral offset position shown at 84, the beam 18 is intercepted by left segment 92 of the lens. The beam 18 is focused at lateral point 92a and when the housing 22 is rotated the focal point 92a will orbit about the longitudinal axis of rotation 72 to form a maximum trepanning orbit to form the maximum sized hole. A like hole is formed by shifting a lens in the opposite direction. In the apparatus described above, the lateral offset is to the right by compressing the hair pin springs 58, 60.

The present invention allows a small to medium diameter hole in the range of 0.005 to 0.450 inches to be machined using a collimated beam of energy such as a laser beam. The collimated laser beam is focused into a small area or spot size. The spot size is laterally positioned with respect to an axis of rotation to provide an orbit offset. Then the lens is rotated about a reference axis of rotation to define a track of a desired diameter as established by the amount of offset. Depending upon the intensity, focal point and rate of rotation, the track can produce a welding pool in metal parts to be joined, or it can form a feature in a workpiece, or it can cut a section from the workpiece, or it can heat treat a workpiece or measure the workpiece.

The principle of operation recognizes that the laser light beam striking a lens will be focused at the focalpoint determined by the shape and the position of the lens. Since the shape is fixed, trepanning adjustment in the present invention is provided by the offset positioning of the lens. The offset and rotation of the fixed shaped lens provides for variability in the trepanning process without use of the primary multiaxis drive system. Suitable limit switch means, including switch 94 are provided to signal completion of a trepanning operation at a given operating position with respect to a workpiece. In accordance with the invention, the multiaxis drive can reposition the laser head at another operating position or positions. Alternatively, conveyor means can position a series of like workpieces with respect to a laser head maintained in a dedicated operating position. The housing 22 has a spring system 96 of the type set forth in U.S. Pat. No. 4,733,048 (commonly assigned).

While representative embodiments of apparatus and methods of the present invention have been shown and discussed, those skilled in the art will recognize that various changes and modifications may be made within the terms of the present invention as set forth in the following claims.

What is claimed is:

1. A beam delivery assembly for focusing a beam of collimated radiation from an energy source comprising:
   a lens holder in said housing having a lens supported thereon in a first aligned position wherein the optical axis of said lens is congruent with a longitudinal axis;
   means for supporting said lens holder for movement laterally within said housing in a plane generally perpendicular to the path of the beam;
   means for supporting said housing for rotation about its vertical longitudinal axis to rotate the lens and lens holder; and
   positioning means for adjusting the supported lens with respect to said longitudinal axis for producing a variable orbital path of the focused beam on a workpiece.

2. In the beam delivery assembly of claim 1, said lens having a focal point, said positioning means including slide means for adjusting the focal point of said lens offset from said longitudinal axis.

3. In the beam delivery of claim 2, said lens holder means including spring means for resiliently limiting travel thereof in one offset direction from said longitudinal axis and for returning said lens holder means in a direction opposite to the one offset direction.

4. In the beam delivery assembly of claim 2, said lens having a focal point, said positioning means including a source of gas pressure and means for applying a pneumatic pressure on said lens holder means for shifting it in directions to offset the focal point of said lens with respect to said longitudinal axis.

5. In the beam delivery assembly of claim 1, said lens holder means including spring means for resiliently limiting travel thereof in one offset direction from said longitudinal axis and for returning said lens holder means in a direction opposite to the one offset direction.

6. In the beam delivery assembly of claim 1, said lens having a focal point, said positioning means including a source of gas pressure and means for applying a pneumatic pressure on said lens holder means for shifting it to offset the focal point of said lens with respect to said longitudinal axis.

7. In the beam delivery assembly of claim 1, said lens having a focal point, said lens holder means including spring means for resiliently limiting travel thereof in one offset direction from said longitudinal axis and for returning said lens holder means in a direction opposite to the one offset direction, said positioning means including a source of gas pressure and means for applying a pneumatic pressure on said lens holder means for shifting it in directions to offset the focal point of said lens with respect to said longitudinal axis.

8. In the beam delivery assembly of claim 1, said lens having a focal point, said positioning means including slide means for adjusting the focal point of said lens outwardly of said longitudinal axis, said lens holder means including spring means for resiliently limiting travel thereof in one offset direction from said longitudinal axis and for returning said lens holder means in a direction opposite to the one offset direction, said positioning means including a source of gas pressure and means for applying a pneumatic pressure on said lens holder means for shifting it in directions to offset the focal point of said lens with respect to said longitudinal axis.

9. A method for cutting circular sections from a workpiece by trepanning comprising the steps of:
   providing a source of laser energy in the form of a collimated beam;
   providing a focusing lens and positioning it in a first position to align the optical axis thereof with a reference axis and position the lens a predetermined distance from the surface of a workpiece;
   adjusting the distance of the focusing lens from the surface of the workpiece to focus the collimated beam thereon;
   laterally offsetting the focusing lens through a lateral offset with respect to the reference axis to vary the location of the focus point on the workpiece; and
   rotating the laterally offset focusing lens to orbit the focal point of the collimated beam on the workpiece to trace the focused beam to produce a trepanning of the workpiece with a diameter which varies in accordance with the lateral offset of the focusing lens.

10. A method for processing a workpiece comprising the steps of:
   directing a collimated beam from an energy source against a focusing lens having a focal point;
   shifting the focusing lens to produce a lateral offset with respect to the collimated beam;
   said shifting of the focusing lens produced by application of a pneumatic pressure thereon; positioning the shifted focusing lens by applying a spring abutment force thereon;
   thereafter rotating the shifted lens to direct the focal point of the lens in an orbital path whose diameter is varied in accordance with the lateral offset of the focusing lens.

* * * * *